United States Patent [19]

Barny et al.

[11] Patent Number: 5,440,939
[45] Date of Patent: Aug. 15, 1995

[54] SERVO-CONTROLLED PENDULAR MICRO-SENSOR

[75] Inventors: Hervé Barny, Valence; Henri Fima, Malissard; Michel Torregrosa, Beaumont les Valence, all of France

[73] Assignee: Sextant Avionique, Meudon La Foret Cedex, France

[21] Appl. No.: 43,387

[22] Filed: Apr. 6, 1993

[30] Foreign Application Priority Data

Apr. 7, 1992 [FR] France .................. 92 04520

[51] Int. Cl.6 .............................................. G01L 1/00
[52] U.S. Cl. .................. 73/862.61; 73/514.18
[58] Field of Search ............ 73/862.61, 517 B, 724, 73/862.626

[56] References Cited

U.S. PATENT DOCUMENTS

| | | | |
|---|---|---|---|
| 3,470,747 | 10/1969 | Rasmussen | 73/517 B |
| 3,877,313 | 4/1975 | Ferriss | 73/517 B |
| 3,911,738 | 10/1975 | Fischer | 73/862.61 |
| 4,131,020 | 12/1978 | Hugli et al. | 73/517 B |
| 4,319,488 | 3/1992 | Hobbs et al. | 73/517 B |
| 4,584,885 | 4/1986 | Cadwell | 73/862.626 |
| 5,095,750 | 3/1992 | Suzuki et al. | 73/517 B |
| 5,331,852 | 7/1994 | Grieff et al. | 73/517 B |
| 5,343,766 | 9/1994 | Lee | 73/517 B |

FOREIGN PATENT DOCUMENTS

0390721 10/1990 European Pat. Off. .

OTHER PUBLICATIONS

M. Paemel, "Interface Circuit for Capacitive Accelerometer", Sensors and Actuators, vol. 17, No. 3 & 4, May 1989, pp. 629–637.

Primary Examiner—Richard E. Chilcot, Jr.
Assistant Examiner—R. Biegel
Attorney, Agent, or Firm—Lowe, Price, Leblanc & Becker

[57] ABSTRACT

An electrostatically servo-controlled pendular micro-sensor includes a pendular element disposed so as to respond to a force representative of a physical quantity to be measured. To avoid the drifts affecting the stability of the micro-sensor, generated by the existence of unstable parasitic voltages that impair the voltages provided by a system servo-controlling the pendular element, the electrostatic forces generated to draw back the pendular element through servo-control voltages have a zero mean value. The control voltages are periodic voltages or series of electric signals of equal durations, each having, preferably, a zero mean value.

12 Claims, 5 Drawing Sheets

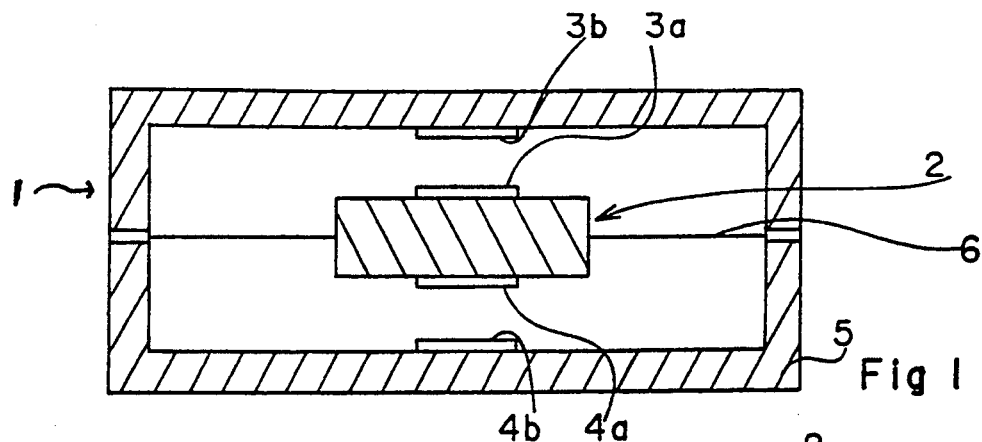
Fig 1
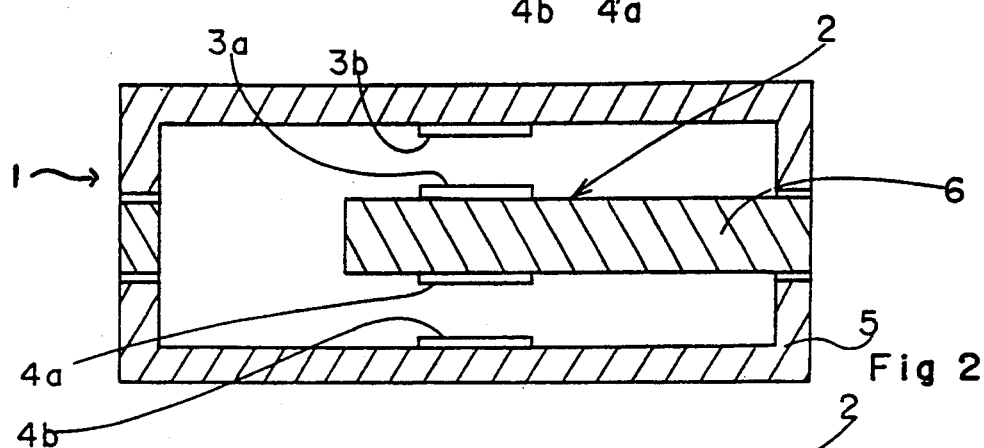
Fig 2
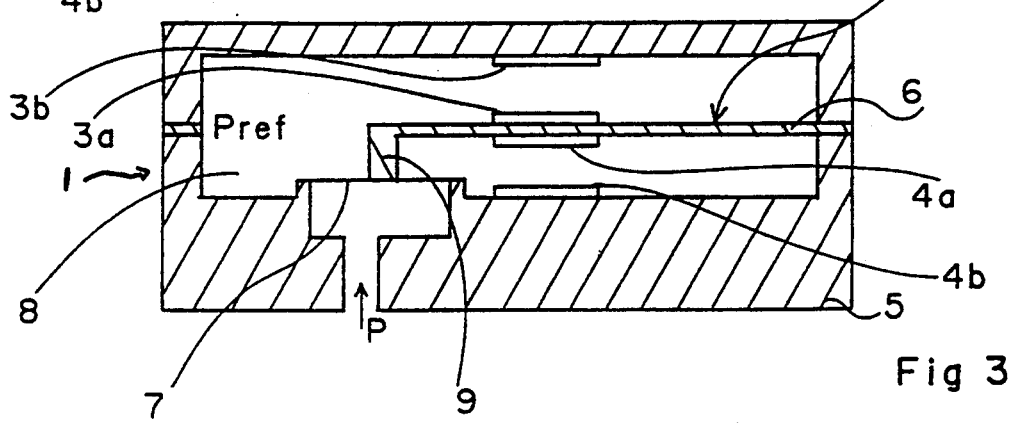
Fig 3
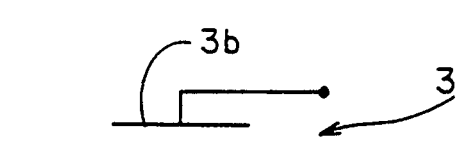
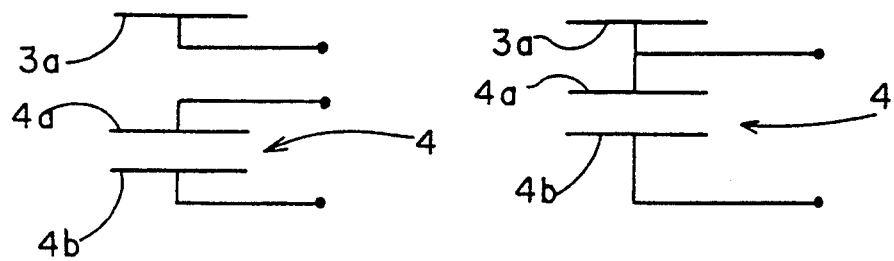
Fig 4a            Fig 4b

SERVO-CONTROLLED PENDULAR MICRO-SENSOR

BACKGROUND OF THE INVENTION

1. Field of the Invention

The present invention relates to electrostatically servo-controlled pendular micro-sensors including a pendular element arranged to be subject to a force representative of a physical quantity to be measured, at least one pair of electrodes including a mobile electrode integral with the pendular element, a fixed electrode facing the mobile electrode, and a system for detecting the displacements of the pendular element controlling an electrostatic servo-control system. The servo-control system applies voltages to the pair of electrodes for applying return electrostatic forces to the pendular element.

The present invention more particularly relates to a servo-control system for the pendular element and its operation mode.

2. Discussion of the Related Art

The above-mentioned micro-sensors include a cell for detecting a physical quantity. The cell includes a slidable or rotatable part, referred to as an "pendular element", elements for suspending the pendular element, and elements for applying onto the pendular element a force representative of the physical quantity to be measured.

The detection cell is achieved through micro-machining or micro-etching of materials such as silicon or quartz.

Such pendular micro-sensors can be used for detection of acceleration, inclination, pressure and, more generally, any physical quantity from which a force acting on the pendular element can be generated.

By way of example, the sensitivity of a pendular micro-accelerometer is due to the inertia phenomenon, the force applied to the pendular element being the product of the pendular element's mass by the acceleration value. For a pressure micro-sensor, there is provided, for example, a diaphragm separating the medium in which the pressure is to be measured from a medium in which the reference pressure is contained, the pendular element contacting the diaphragm or being integral therewith in order to respond to a force resulting from the difference between the pressure to be measured and the reference pressure.

The electrostatically servo-controlled pendular micro-sensors further include a system for detecting the displacements of the pendular element, acting on an electrostatical servo-control system that generates on the pendular element a return force opposing the force generated by physical quantity. Since the pendular element is maintained in quiescent position, the intensity of the physical quantity is determined by measuring the reaction force.

Various systems for detecting displacements of the pendular element are known, especially so-called "capacitive" detection systems, in which the position of the pendular element is determined from the capacitance variation of at least one capacitor including a fixed electrode and a mobile electrode integral with the pendular element.

Generally, in order to provide a return electrostatic force on the pendular element, one applies, between a fixed electrode of the sensor and an electrode integral with the pendular element, a d.c. voltage ranging from a few volts to several hundred volts, depending on the applications. An electrostatic attraction, having an intensity proportional to the squared applied voltage, is generated between the electrodes and tends to bring the pendular element closer to the fixed electrode of the sensor.

When the direction of the return electrostatic force is to be monitored, at least two electrode pairs, disposed on both sides of the pendular element, are used. Then, the pendular element can be restored by applying a determined voltage to the appropriate electrode pair. Another alternative is to constantly maintain two opposite electrostatic forces while acting on the unbalance of their intensities so as to generate a resulting return force having the same direction as the direction of the highest electrostatic force.

Two techniques are mainly used to vary the intensity of the electrostatic force. The first technique consists in varying the value of the d.c. voltage applied to the electrodes. The second so-called "pulse width modulation" (PWM) technique consists in using a chopped d.c. voltage and varying the duty cycle so as to modulate the mean value of the servo-control voltage.

In order to simplify the detection cell, the servo-control electrodes are frequently used for detecting the position. Then, steps are to be taken so that the detection and control voltages do not interfere.

For a better understanding, exemplary detection cells, sensitive to a physical quantity, are described hereinafter.

FIGS. 1-3, which are referred to by way of example only, schematically show various types of sensitive cells including two pairs of return electrodes.

FIGS. 1 and 2 schematically show sensitive cells of inertial micro-sensors capable of detecting acceleration, inclination, angular frequency, etc. FIG. 3 schematically shows the sensitive cell of a pressure micro-sensor.

Each sensitive cell 1 comprises a pendular element 2 including, on two opposite sides, electrodes $3a$, $4a$ respectively facing two fixed electrodes $3b$, $4b$ formed on the body 5 of the sensitive cell 1. The electrodes $3a$, $3b$, $4a$, $4b$ form two pairs of electrostatic return electrodes 3, 4, acting in complementary directions.

Suspension means 6 maintain the pendular element 2 in the absence of return electrostatic forces. In FIGS. 2 and 3, the suspension means 6 correspond to the base 6 of the pendular element 2 and forms therewith a vibrating beam.

The sensitive cell 1 of FIG. 3 further includes means for applying on the pendular element 2 a force representative of the pressure to be measured. Here, this means is a diaphragm 7 separating the external medium of the sensitive cell 1 from an internal medium 8 at reference pressure P. The pendular element 2 includes a protruding portion 9 contacting diaphragm 7.

The equivalent electric diagram of the sensitive cells of FIGS. 1-3 is shown in FIG. 4a and includes the two above-described electrode pairs 3 and 4.

In FIGS. 1-3 the sizes of the various elements and the intervals separating electrodes $3a$ from $3b$, or $4a$ from $4b$, are not drawn to scale but are arbitrarily drawn in order to facilitate legibility of the drawings. In practice, a cell 1 has a thickness of a few tenths mm and a length of a few mm; the distance between the electrodes being only a few tenths $\mu$m.

In FIGS. 1-3 are not shown the electric connections for accessing electrodes $3a$, $3b$, $4a$, $4b$. Various technological methods are available and are not part of the invention.

However, it should be noted that the pendular element 2 can be made of a conductive material, such as silicon, and electrodes 3a and 4b can be made of doped silicon. Such a method uses a single electric connection for electrodes 3a and 4a, as indicated in FIG. 4b.

The above-described micro-sensors exhibit numerous advantages due to their small size and their good sensitivity. However, it is noted that sometimes the information provided by such micro-sensors drifts in time, for a given physical value.

SUMMARY OF THE INVENTION

An object of the invention is to avoid this drawback.

A more specific object of the invention is to eliminate the drift phenomena without modifying the geometrical structure of the known conventional micro-sensors.

The invention is based on the applicant's determination of the existence of d.c. parasitic voltages, liable to drift in time and to vary from one sensor to another, which are added, at the micro-sensor electrodes, to the voltages provided by the servo-control system. The applicant considers that such parasitic voltages are due to physico-chemical phenomena affecting the conductive materials of the electrodes and their interfaces.

From this analysis, the applicant provides a method for applying control voltages that avoids the detrimental effect of these parasitic voltages.

More particularly, the invention provides a method for producing an electrostatic attraction force between a mobile electrode and a fixed electrode for a micro-sensor measuring a physical quantity, the mobile electrode being integral with a pendular element sensitive to this physical quantity. The method consists in imparting an electrostatic return force to the electrodes by applying to the electrodes a voltage having a mean value equal to zero.

According to an embodiment of the invention, the voltage is an a.c. voltage having a frequency significantly higher than the cut-off frequency of the pendular element.

Advantageously, in order to servo-control, through electrostatic forces, a pendular element of a micro-sensor including at least one first and one second pair of electrodes, each including a mobile electrode associated with the pendular element, a fixed electrode disposed in front of the mobile electrode, and a system for detecting the displacements of the pendular element providing a control signal for the servo-control operation to be carried out, first and second servo-control voltages are respectively applied on the electrode pairs. The first and second servo-control voltages have the same frequency and the difference of the squared respective amplitudes of the first and second servo-control voltages constitutes the product of a constant term by a term proportional to the control signal.

Advantageously, the first control voltage is obtained by subtraction and the second control voltage is obtained by addition of a periodic voltage having a constant amplitude and of a periodic voltage having an amplitude proportional to the control signal.

According to a second embodiment of the invention, the voltage includes a plurality of electric signals having equal durations.

Preferably, each electric signal has a zero mean value.

Advantageously, each electric signal includes a train of periodical pulses.

Advantageously, the periodic pulse trains are square waves having a null mean value.

The invention is also directed to a pendular micro-sensor servo-controlled by electrostatic forces provided according to the above second embodiment of the invention, including a pendular element disposed so as to respond to a force that is representative of a physical quantity to be measured. At least one first and one second electrode pair include a mobile electrode associated with the pendular element, and a fixed electrode disposed so as to face the mobile electrode. The micro-sensor further includes a combination of switches, and at least two d.c. voltage sources of opposite polarity signs; an integrating circuit whose output is applied to the input of a digital modulator of the sigma-delta type through a filter, the digital modulator providing a logic signal the mean value of which is modulated as a function of the output voltage of the integrating circuit; and a digital circuit, to which is applied the logic signal, useful for sequencing and controlling the switch combination. The digital circuit and the set of switches are arranged for:

(a) during the electrostatic servo-control phases of the pendular element:
  alternatively connecting at least one electrode of one electrode pair, selected as a function of the value of the logic signal, to each of the d.c. voltage sources, and
  alternating the d.c. voltage source connected to at least one electrode of a selected electrode pair, several times during a servo-control phase, or several times during several servo-control phases;

(b) during the phases of detection of the position of the pendular element, following each servo-control phase:
  charging the capacities of the electrode pairs through the source voltages, then simultaneously discharging the capacities in the integrating circuit, with respective currents having opposite signs.

Advantageously, each electrode of each electrode pair is connected to each of the d.c. voltage sources through a switch from the switch combination.

The foregoing and other objects, features, aspects and advantages of the invention will become apparent from the following detailed description of the present invention when taken in conjunction with the accompanying drawings.

BRIEF DESCRIPTION OF THE DRAWINGS

FIG. 1-3 are cross-sectional views, drawn along the displacement axis of a pendular element, showing exemplary sensitive cells usable in conventional pendular micro-sensors using two electrode pairs;

FIGS. 4a and 4b show the equivalent electric circuit of the sensitive cells of FIGS. 1-3;

DETAILED DESCRIPTION

Figure 5:
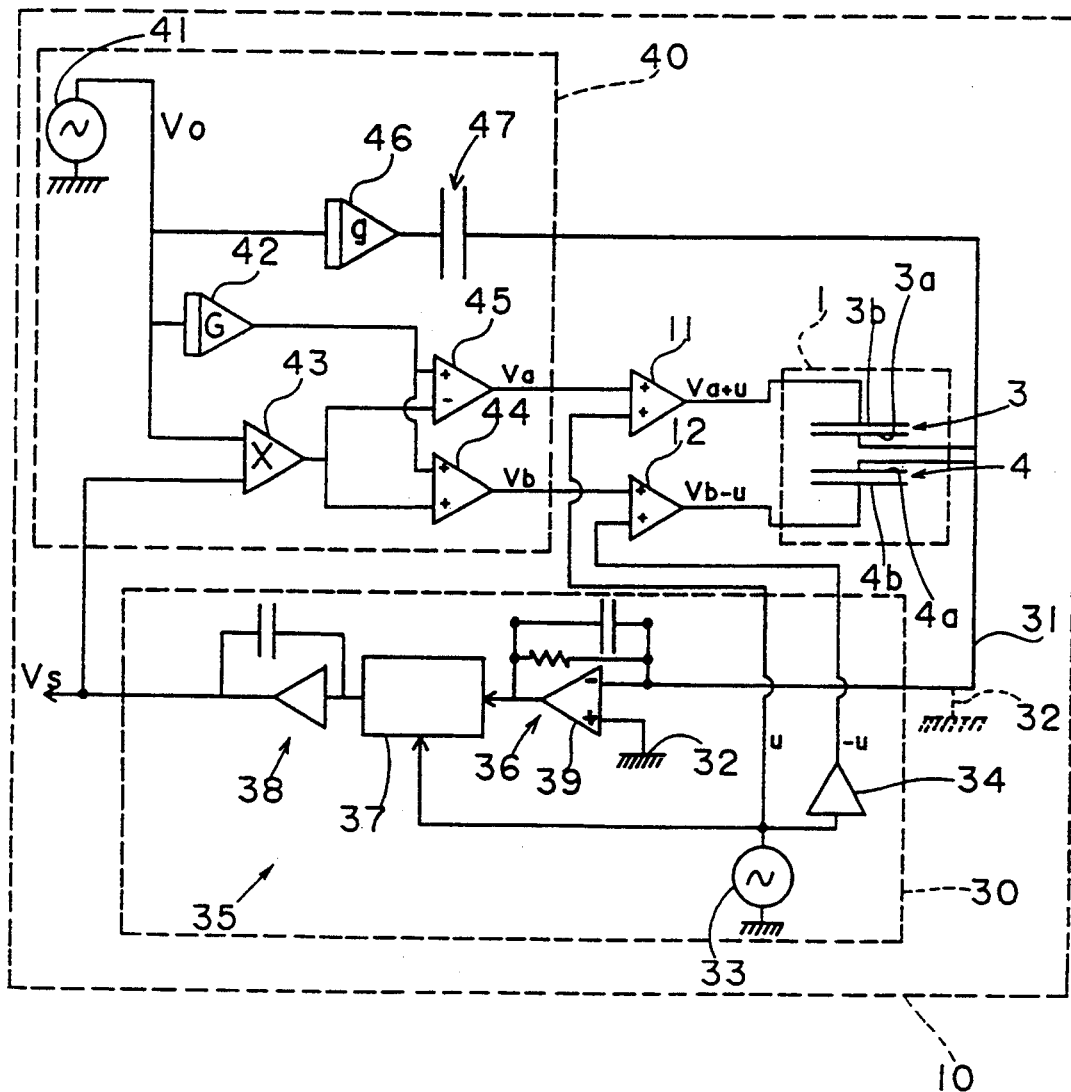
FIG. 5 is a general diagram of an embodiment of the invention including analog circuits usable in association with the sensitive cells shown in FIGS. 1-3.

Influence of parasitic voltages on the electrostatic force

As indicated above, the invention is based on the determination by the applicant that the drift phenomena occurring in various known sensors are due to the existence of unstable parasitic voltages that impair the control voltages provided by a servo-control system.

Firstly, we will study the effect of such parasitic voltages when an electrostatic force is applied to a pendular sensor.

Generally, for any electrode pair responding to a voltage U, an electrostatic attraction force is generated between the electrodes. The attraction force expression is:

$$F = SU^2/\epsilon^2 d^2 = KU^2$$

where $\epsilon$ is the electric permittivity of the gas present between the electrodes, S the electrode surface, d the distance between the electrodes, and K a constant combining terms $\epsilon$, S and d.

Now, referring to FIGS. 1–4, above described, consider a pair of electrodes 3 or 4 including a fixed electrode 3b or 4b, and a mobile electrode 3a or 4a associated with a micro-sensor pendular element 2.

The detrimental effect of the parasitic voltages, when the electrostatic force is obtained through a d.c. voltage V, will be considered. The global parasitic voltage present on the electrodes is represented by a d.c. voltage v.

In order to determine the electrostatic force, voltages V and v must be accounted for, $U = V + v$ being the global voltage acting on the above-mentioned electrodes.

In that case, the equation of the generated electrostatic force is $F = K[V^2 + v^2 + 2Vv]$ instead of $KV^2$.

For the sake of clarity, consider a representative example, where $$V = 10 \text{ V, and } v = 50 \text{ mV}.$$

The term $2Vv$ is much higher than term $v^2$. Its influence, in percent, on the force generated is $2v/V = 2 \times 50 \cdot 10^{-3}/10$, i.e. 1% of the force that would have been generated without parasitic voltage, which is a non negligible value. This influence is all the more disturbing as, as indicated above, term v varies from one device to another and drifts for a given device.

The prior art PWM methods which use d.c. square waves provide the same result as above because the equation of the electrostatic force is expressed as a function of the mean value of the voltage interval, which is a d.c. voltage.

Electrostatic force obtained by the method according to the invention

In order to decrease the detrimental effect of the parasitic voltages v on the servo-control electrostatic force, the invention provides for generating the electrostatic force through a voltage having a zero mean value, that can be expressed as follows:

$$V' = V_M f(t)$$

where $V_M$ is a constant representing the maximum amplitude that can be reached by the control voltage, f(t) is a function representing the fluctuations of the control voltage, whose mean value is zero ($\overline{f(t)} = 0$)).

Preferably, the control voltage V' according to the invention has a zero mean value on time intervals much shorter than the mechanical time constant of the pendular element so that the control voltage fluctuations are significantly dampened by the pendular element. So, only the mean value of the electrostatic force is taken into account and the following equation may be written:

$$\overline{F} = \overline{KU^2} = K[V_M^2 \overline{f(t)^2} + v^2 + 2v\, V_M \overline{f(t)}].$$

The last term of this equation being zero, one has:

$$\overline{F} = K[V_M^2 \overline{f(t)^2} + v^2].$$

Term $\overline{f(t)^2}$ is a non zero constant. If f(t) is a sine wave function, $\overline{f(t)^2} = 0.5$.

Let consider the following example, in which the same values as above are taken:

$$V_M = 10 \text{ V}, \overline{f(t)^2} = 0.5, \text{ and } V = 50 \text{ mV};$$

here, $V_M^2 \overline{f(t)^2} = 0.5 \times 100$ (volts²).

The detrimental effect of the parasitic voltage, corresponding to term $v^2$, is $v^2/V_M^2 \times \overline{f(t)^2}$ and is here 0.005% only of the electrostatic force that would be generated without parasitic voltages. The influence of the parasitic voltages is therefore significantly decreased with the method according to the invention since it is of the second order only.

Influence of the parasitic voltages on the output information provided by a controlled micro-sensor The above-described theoretical principles were directed to the electrostatic force expression. Now, we will study the detrimental effect of parasitic voltages on the output information provided by a pendular micro-sensor whose sensitive cell conventionally includes two electrode pairs, such as those shown in FIGS. 1–3 for applying a return force to the pendular element.

For the sake of simplicity, a conventional embodiment of a servo-control method of the prior art will be considered.

According to this embodiment, and with reference to FIG. 4b, electrodes 3a and 4a (or 3b and 4b) are connected to a biasing d.c. voltage $V_O$. Control d.c. voltages $+V$ and $-V$, having opposite polarities and equal values, are applied to electrodes 3b and 4b (or 3a and 4a), respectively. The d.c. voltages generating electrostatic forces on the pairs of electrodes 3 and 4 are then equal to $(V - V_0)$ and $-(V + V_0)$, respectively.

Conventionally, the output signal $V_s$ provided by a system detecting the position of the pendular element 2 (and used as output information of the micro-sensor), can be expressed as a function of the force due to the physical quantity applied to the pendular element 2.

In the absence of parasitic voltages, the equation can be as follows:

$$V_S = K_2 B_0 + K_2 F^* + K_3 F^{*2},$$

where $B_0$ represents the normal offset introduced by the suspension elements 6, whose elastic quiescent state does not correspond to the quiescent state of the servo-controlled pendular element; $F^*$ is the force acting on the pendular element 2, resulting from the physical quantity; $K_2$, $K_3$ are constants of the first and second order.

Due to the presence of parasitic voltages, the offset value $B_0$ is modified by a quantity $\Delta B_0$:

$$\Delta B_0 = 2K_4 V_0 (v_2 - v_1),$$

where $K_4$ is a constant, $v_1$ and $v_2$ represent parasitic voltages respectively acting on the electrode pairs 3 and 4.

It can be appreciated that $\Delta B_0$ depends upon the biasing voltage $V_0$. The influence of the parasitic voltages $v_1$ and $v_2$ on the variation $\Delta B_0$ of offset $B_0$ is amplified by a factor corresponding to the biasing voltage $V_0$. Of course, this relates to the case, frequently encountered in practice, where $v_1 \neq v_2$.

Influence of parasitic voltages when the micro-sensor is controlled according to the method of the invention Again for the sake of simplicity, the following description is limited to a specific embodiment of the invention, which will be disclosed hereinafter in more detail. In this specific embodiment, the servo-control electrostatic force is generated through periodic control voltages.

Voltages having zero mean values are applied to the pairs of electrodes 3 and 4, for example, sine wave control voltages $V_a$ and $V_b$ that are represented as follows:

$$V_a = V_{Ma} \cos \omega t$$

$$V_b = V_{Mb} \cos \omega t.$$

The two control voltages $V_3$ and $V_4$ have the same pulse duration $\omega$ and are in phase coincidence one with respect to the other.

The equation of the output voltage $V_s$ is unchanged as compared to the preceding example, but it is demonstrated that variation $\Delta B_0$ of the offset $B_0$, due to the parasitic voltages, is now as follows:

$$\Delta B_0 = K_4 (v_2^2 - v_1^2) = K_4 (v_2 + v_1)(v_2 - v_1),$$

where $K_4$ is the same constant as in the preceding example.

With the method according to the invention, the influence of the parasitic voltages $v_1$, $v_2$ is low, variation $\Delta B_0$ is decreased by a factor $v1 + v2/2 V_0$ as compared to the prior art method.

In a practical example where $$v_1 + v_2 = 100 \text{ mV, and } V_0 = 10 \text{ V},$$

$v_1$ being of course different from $v_2$, it can be appreciated that the influence of the parasitic voltages at the output of a servo-controlled micro-sensor is 200 times lower with the method according to the invention.

First embodiment of the invention

FIG. 5 schematically shows the electronic portion of a micro-sensor 10 controlled according to the method of the invention. The micro-sensor 10 includes a sensitive cell 1, some examples of which are above described with reference to FIGS. 1–3. The sensitive cell 1 is shown in FIG. 5 as in FIG. 4a, according to its equivalent electric diagram including two pairs 3, 4 of electrodes 3a, 3b, respectively 4a, 4b.

The micro-sensor 10 further includes a control circuit 40 and a circuit 30 for detecting the displacements of the pendular element 2 that provides a voltage $V_s$ used as an output information of the micro-sensor 10 and as a control signal of the control circuit 40.

The control circuit 40 includes a voltage source 41 providing a periodic voltage, here a sine wave voltage of pulsation $\omega$, frequency f and amplitude $V_0$ which is respectively applied to the input of an amplifier 42 having a gain G, and to a first input of a multiplier 43 whose second input receives the control signal $V_s$ provided by the control circuit 30. The voltages provided by the amplifier 42 and multiplier 43 are added through an adder 44 and subtracted through a differential amplifier 45 that receives the output of multiplier 43 at the negative input, and the output of amplifier 42 at the positive input.

At the outputs of the differential amplifier 45 and adder 44, respectively appear voltages $V_a$ and $V_b$ expressed as follows:

$$V_a = (G - VS) V_0 \cos \omega t.$$

$$V_b = (G + VS) V_0 \cos \omega t.$$

Voltages $V_a$ and $V_b$ are intended to be applied respectively to the electrode pairs 3 and 4 in a way that will be described hereinafter so as to control the return electrostatic force of the pendular element 2.

The detection circuit 30 is a conventional capacitive detection circuit that uses in the present case the control electrode pairs 3 and 4 as detection capacitors 3 and 4.

The detection circuit 30 provides two detecting a.c. voltages of opposite signs, u and $-u$, respectively. For this purpose, the detection circuit 30 includes a voltage source 33 (here, a sine wave having a pulse duration $\omega'$ and a frequency f'), providing voltage u. Voltage $-u$ is provided through an inverter 34 fed by the voltage source 33.

In order to combine the control voltages $V_a$ and $V_b$ with the detection voltages u and $-u$, the micro-sensor 10 includes two adders 11 and 12 receiving input voltages $V_a$ and u, respectively $V_b$ and $-u$, and providing voltages $V_a + u$, respectively $V_b - u$, to electrodes 3b and 4b of capacitors 3 and 4.

The detection circuit 30 further includes a detection module 35 comprising a high-gain current-voltage converter 36, a synchronous demodulator 37, and an integrator 38. A synchronization input of demodulator 37 is connected to the voltage source 33. Integrator 38 preferably has a practically infinite gain and provides the output voltage $V_s$.

Converter 36 is represented in FIG. 5 by an operational amplifier 39 whose inverting input is the input of the detection module 35, and whose non-inverting input is connected to ground 32. The current-voltage conversion of converter 36 is carried out by a resistor and a capacitor disposed in parallel and connecting the inverting input to the output of the operational amplifier 39.

The electrodes of capacitors 3 and 4 that remain available (here, electrodes 3a and 4a) are connected to an electric connection 31 leading to the input of the detection module 35, that is, here, to the inverting input of operational amplifier 39, acting as a floating ground 32 (drawn in dotted line in FIG. 5) and allowing current to flow through capacitors 3 and 4.

The detection voltages u and $-u$ generate in each capacitor 3 and 4 a.c. currents that are added together in connection 31 so as to form, at the input of the detection module 35, a so-called "unbalance current" representative of the difference between the detection capacitors 3 and 4. The unbalance current is zero when capacitors 3 and 4 have equal values.

Converter 36 and demodulator 37 convert the unbalance current into an error voltage proportional to the unbalance value of the detection capacitors 3 and 4. Integrator 38 then provides the output voltage $V_s$ that is required for controlling the control circuit 40.

The proper operation of the control circuit 40 according to the invention will be evidenced by demonstrating that the return electrostatic force F of the pendular element 2 is proportional to the control voltage $V_s$ injected at the input of the control circuit 40.

The return electrostatic force F is a resultant of two opposite electrostatic forces $F_a$ and $F_b$, generated on electrode pairs 3 and 4 through the control voltages $V_a$ and $V_b$, that can be expressed as follows:

$$F_a = K_a V_a^2$$

$$F_b = K_b V_b^2$$

and $$F = F_a - F_b,$$

where $K_a$ and $K_b$ are constants combining terms $\epsilon$, S, d, of the electrode pairs 3 and 4.

Here, electrode pairs 3 and 4 having the same ratio $S/d^2$ are used. Assuming $K_a = K_b = K$, the resulting force F is:

$$F = K(V_b^2 - V_a^2) = K(V_b + V_a)(V_b - V_a)$$

that is, $$F = 4 K G V_0^2 V_s (\cos \omega t)^2,$$

where G is the gain of amplifier 42 and $V_0$ the amplitude of the voltage provided by the source 41.

Advantageously, the frequency f of source voltage 41 is selected very high with respect to the cut-off frequency Fc of the pendular element 2 (Fc=1/t, $\tau$ being the mechanical time constant of the pendular element 2).

Therefore, the oscillation generated by the highly dampened $2\omega$ component of term $(\cos \omega t)^2$ is neglected; the mean value $\overline{F}$ of force F only is accounted for. Since the mean value of the $2\omega$ component is zero, the following equation is obtained:

$$\overline{F} = 2 K G V_0^2 V_s.$$

The mean return force $\overline{F}$ is actually proportional to the control voltage $V_s$ of the control circuit 40, since terms K, G, and $V_0$ are constants.

In practice, it is possible to act on the gain G of amplifier 42 and on the amplitude $V_0$ of the voltage source 41 to adjust the sensitivity of the control circuit 40.

It should be noted that the electrostatic forces generated by the detection voltages u, −u are not taken into account in the expression of force F. Indeed, these forces have equal intensities and their effect on the pendular element 2 is mutually cancelled.

Preferably, in order that the detection circuit 30 and control circuit 40 act in well distinct frequency ranges, frequencies f and f' are selected so as to be very different one from the other and so that the value of one frequency is not a multiple of the value of the other frequency in order to prevent harmonics of the control frequency f from impairing the detection frequency f'.

However, in practice, it is necessary to account for the influence of voltages $V_a$ and $V_b$ that generate at the input of the detection module 35 a parasitic current capable of saturating the detection module. It is therefore advantageous to eliminate such parasitic current.

To achieve this purpose, the servo-control circuit 40 further includes an amplifier 46 having an adjustable gain g. The input of amplifier 46 receives the voltage of source 41, the output of amplifier 46 is connected to a capacitor 47 that is connected at its second terminal to connection 31 so as to inject a current cancelling the current generated by the control voltages $V_a$ and $V_b$.

An alternative is to conventionally use different electrodes for the control and detection functions. On the other hand, the servo-control circuit 40 according to the invention can be used with a detection circuit implementing an approach different from the capacitive detection technique, the control circuit 30 having been described by way of example only.

The servo-control circuit 40 according to the invention can be used in a micro-sensor including more than two pairs of electrostatic return electrodes by combining the return electrode pairs in two groups of electrode pairs, each group acting in complementary directions for drawing back the pendular element 2.

Lastly, it will clearly appear to those skilled in the art that numerous variants allow to obtain control voltages ($V_a$, $V_b$) according to the invention. In all cases, the difference of the squared amplitudes of the control voltages ($V_a$, $V_b$) must be equal to the product of a preferably adjustable constant term by a term proportional to the control voltage $V_s$ of the control circuit.

Second embodiment of the invention

Figure 6:
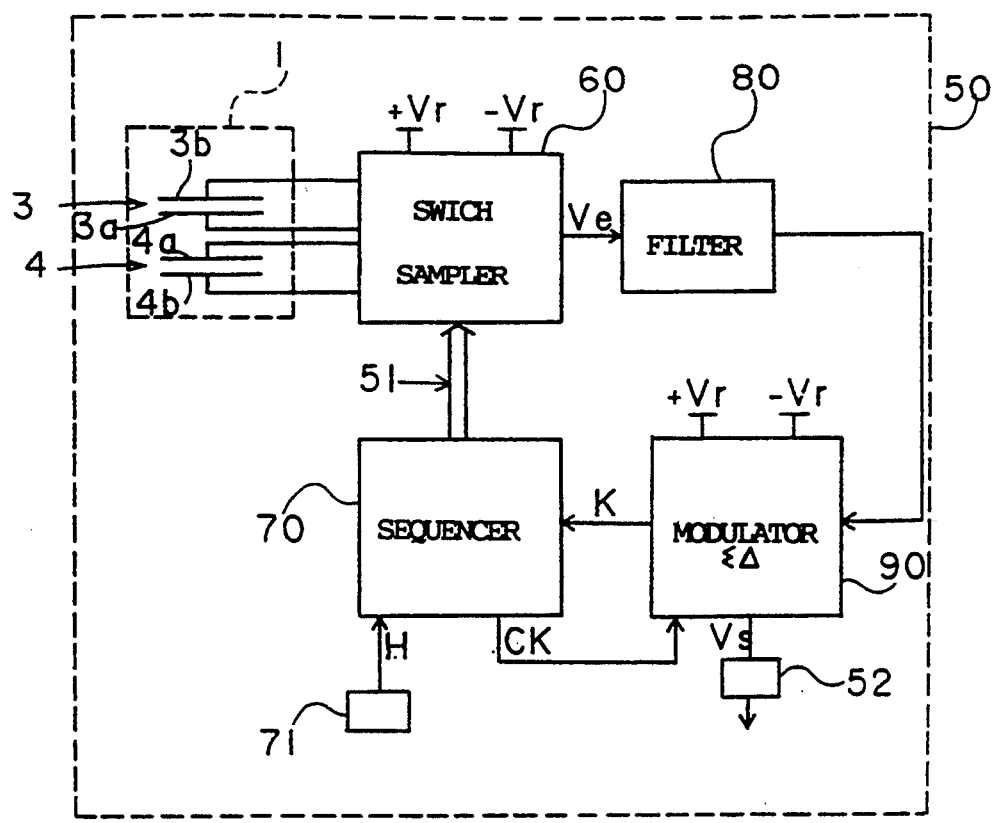
FIG. 6 schematically shows an alternative embodiment of the invention including digital circuits usable in association with the sensitive cells shown in FIGS. 1-3.

FIG. 6 is a simplified diagram of a micro-sensor 50 controlled according to the invention.

The micro-sensor 50 includes a sensitive cell 1, similar to the cells already described with reference to FIGS. 1–3. In the sensitive cell 1, the return electrodes 3a, 3b and 4a, 4b act as detection capacitors 3 and 4. The use of the same electrodes for the measurement and servo-control phases involves a method for separating the signals. In the first above-described embodiment of the invention, the separation of signals is achieved by using different frequential ranges. Here, time multiplexing is used, that is, a measurement phase and a control phase do not overlap.

For this purpose, the micro-sensor 50 includes a logic sequencer 70, clocked by a clock 71, to sequence the measurement and control phases. Additionally, sequencer 70 controls, through a parallel bus 51, a switching and sampling module 60. The switching and sampling module 60 is connected to capacitors 3 and 4 of the sensitive cell 1, and periodically achieves, from the two opposite d.c. voltages $+V_r$ and $-V_r$, servo-control operations and measures of the difference between the detection capacitors 3 and 4. Module 60 provides a sampled error voltage $V_e$ representative of the difference between capacitors 3 and 4. Error voltage $V_e$ is filtered in a PID-type loop filter 80 (whose function is to ensure the servo-control stability), and applied at the input of a sigma-delta digital modulator 90 that uses voltages $+V_r$ and $-V_r$ as internal reference voltages and provides to sequencer 70 a logic signal K whose mean value is proportional to the error voltage $V_e$. The logic signal K is enabled by a synchronization logic signal CK provided by sequencer 70 and applied to modulator 90. Modulator 90 provides an output signal $V_s$ used as an output signal for the micro-sensor 50 after filtering in a low-pass cell 52. Voltages $+V_r$ and $-V_r$ can be provided by an external supply source or by conversion (not shown in FIG. 6) of the supply voltage of the circuits of the micro-sensor 50.

Figure 7:
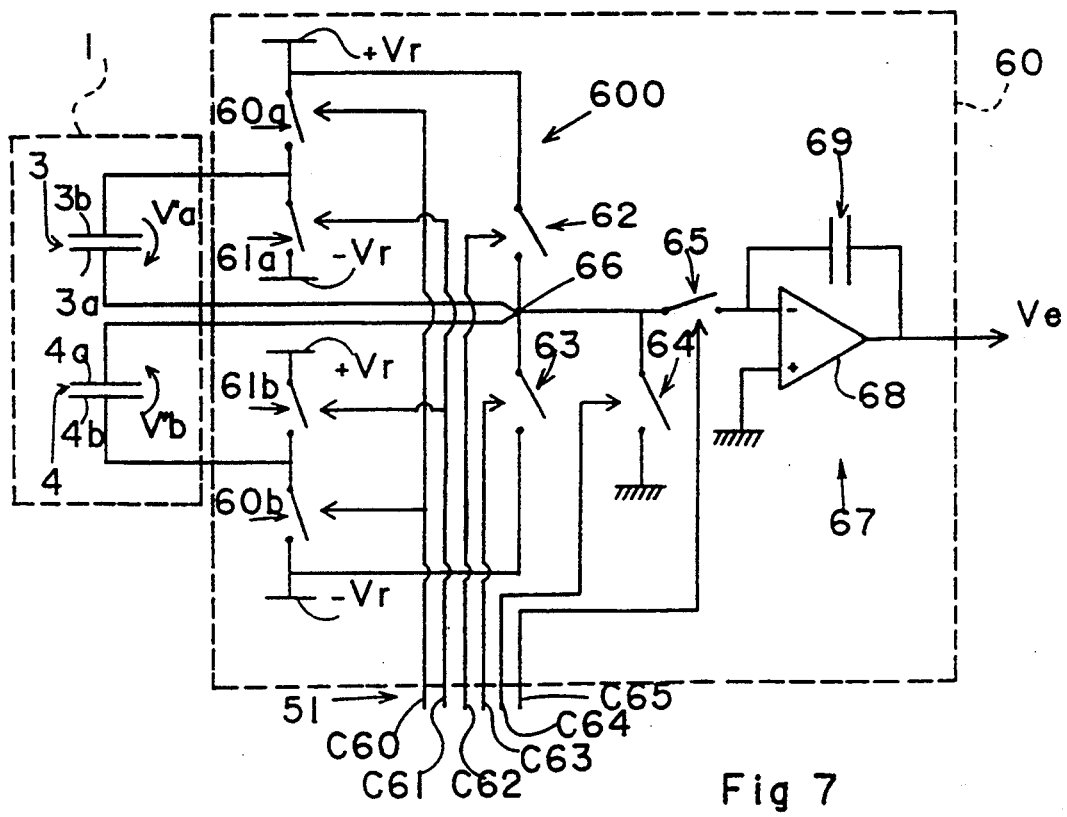
FIGS. 7 and 9 show more detailed portions of the drawing of FIG. 6.

FIG. 7 schematically shows an embodiment of the switching and sampling module 60. Module 60 includes a switching assembly 600, here including 8 switches referenced 60a, 60b, 61a, 61b, 62, 63, 64, 65, that are controlled by logic signals, C60, C61, C62, C63, C64, C65, respectively, transmitted by sequencer 70 and carried on bus 51. Switches 60a and 60b are both controlled by signal C60; switches 61a and 61b are controlled by signal C61.

Switches 60a, 60b, 61a, 61b, 62, 63 are grouped to form three switch legs 60a and 61a, 61b and 60b, 62 and 63, respectively, disposed between voltages $+V_r$ and $-V_r$. Switches 60a, 61b, 62 are connected to voltage $+V_r$; switches 61a, 60b and 63 are connected to voltage $-V_r$. The medium tap of the leg formed by switches 60a, 61a is connected to electrode 3b of capacitor 3; the medium tap of the leg formed by switches 61b, 60b is similarly connected to electrode 4b of capacitor 4.

Electrodes 3a and 4a, the medium tap of the leg formed by switches 62 and 63, and the respective terminals of switches 64 and 65 are interconnected at a node 66. The second terminal of switch 64 is connected to the ground terminal of micro-sensor 50. Switch 65 is connected to an integrator 67, here including an operational amplifier 68 having its output connected back to the negative input by a capacitor 69 and its positive input grounded. At the output of integrator 67, the above-mentioned error signal $V_e$ is provided.

Figure 8:
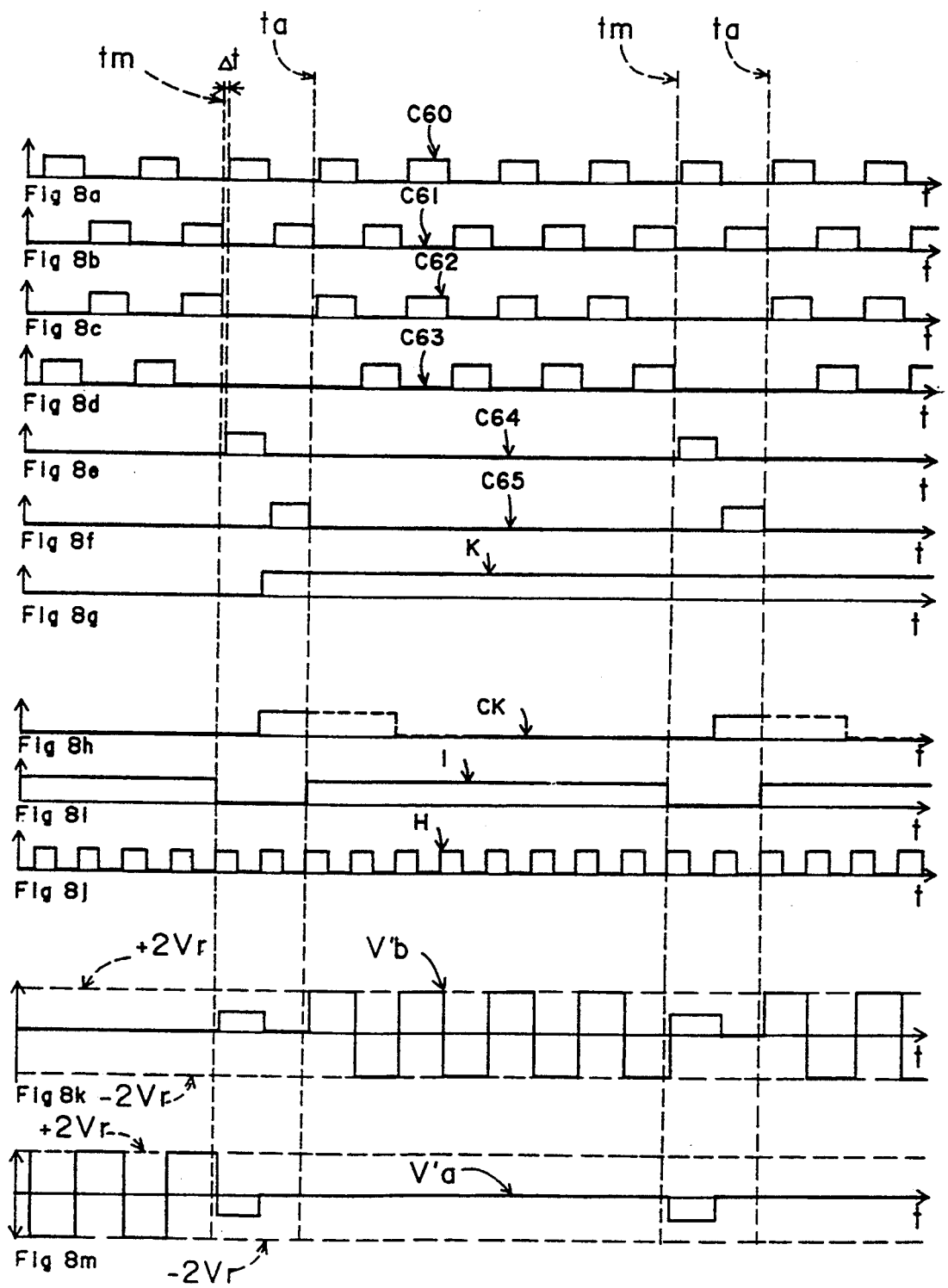
FIG. 8 schematically shows various time signals appearing at various points of the circuits represented in FIGS. 7 and 9.

FIG. 8 shows in more detail the operation of sequencer 70 and illustrates the timing diagrams of the signals transmitted and received by sequencer 70, as well as some internal signals. Those skilled in the art will note that sequencer 70 can be conventionally realized by using a wired logic circuit, a microprocessor, or a specific integrated circuit, provided that the timing diagrams of the signals to be sequenced are known.

FIGS. 8a, 8b, 8c, 8d, 8e, 8f show timing diagrams of the states of the control signals C60, C61, C62, C63, C64, C65, respectively.

FIG. 8g schematically illustrates the logic signal K received by sequencer 70 and provided by modulator 90.

FIG. 8h schematically illustrates the enabling signal CK of signal K, applied by sequencer 70 to modulator 90.

FIG. 8i schematically illustrates a state signal I internal to sequencer 70. Signal I is conventionally set to 1 during the control phases and to 0 during the measurement phases.

FIG. 8j schematically shows signals H of clock 71 constituting the time basis of sequencer 70.

FIGS. 8k and 8m respectively show curves $V'_b$ and $V'_a$ of voltages across capacitor 4 and 3, the reference directions of which are indicated by arrows in FIG. 7.

FIG. 8 shows in dotted vertical lines times $t_a$ and $t_m$ from which the servo-control phases ($t_a$) and measurement phases ($t_m$) start. In this figure, the servo-control and measurement phases successively occur without any interruption. Duration periods of two periods of clock 71 for the measurement phase (I=0) and eight periods of clock 71 for the control phase (I=1) have been selected in the present example.

Conventionally, the control signals C60–C65 are set to the logic state 1 to switch switches 60a–65 on.

Clock 71 provides square-wave signals H (FIG. 8j) having a duty cycle equal to 0.5.

Signal CK (FIG. 8h) is set to 1 by sequencer 70 in the middle of each measurement phase ($t_m$ to $t_a$) to cause charging of a new value of signal K at the output of the digital modulator 90. Signal K can change its value only during a variation (here, a rising edge) of the control signal CK; the value of K therefore remains constant during the whole period of the control phases. An exemplary embodiment of modulator 90 will be described hereinafter. It should be noted at this stage that signal K at 1 indicates to sequencer 70 that an electrostatic attraction force has to be generated between electrodes 4a and 4b of capacitor 4; signal K at 0 indicates that the electrostatic force has to be generated between electrodes 3a and 3b of capacitor 3.

The periods during which the control signals C60–C65 are at 1 do not exceed one clock duration of clock 71. Additionally, to avoid any shorting risks, each control signal C60–C65 is set to value 1 (with switches on) with a slight delay with respect to the edges of clock 71 (FIG. 8j). This slight difference $\Delta t$ is represented in FIG. 8 by a dotted line.

It can be seen in FIGS. 8a and 8b that the timing diagrams of the control signals C60–C65 are regular and do not depend upon the occurrence of the measurement or control phases. The control signals C60 and C61 are non overlapping and are each set to 1 every two periods of clock 71 for a one period duration. Therefore, at each clock period, one of the two control signals C60, C61 is at 1 while the other is at 0. Here, C60 is always set to 1 at the beginning of the control periods ($t=t_a$) and measurement periods ($t=t_m$).

Servo-control phases

The control signals C62 and C63 are used for the servo-control phases and are at 0 during the measurement phases. During servo-control phases, C62 and C63 are respectively identical to C60 and C61. When K=1, C62 is in synchronism with C60 while C63 is in synchronism with C61. When K=0, C62 is in synchronism with C61 while C63 is in synchronism with C60.

FIGS. 8k and 8m schematically show the variations of voltages $V'_b$ and $V'_a$ across capacitors 4 and 3, due to the sequencing of the above-described control signals C60, C61, C62 and C63.

When K=1, voltage $V'_a$ is zero and voltage $V'_b$ alternatively fluctuates, from $+2 V_r$ to $-2 V_r$ or from $-2 V_r$ to $+2 V_r$, at each period of clock 71. Therefore, the electrostatic force is generated on the electrode pair 4a, 4b. The value of the force can be calculated by taking the mean square value of voltage $V'_b$ (here, equivalent to the square of a d.c. voltage having a value $+2 Vr$) but with the advantages of the invention regarding the parasitic voltages, because its mean value is zero.

When K=0, voltage $V'_b$ is zero; voltage $V'_a$ is equivalent to voltage $V'_b$ that is described for K=1, the electrostatic force being then applied to the electrode pair 3a, 3b.

Measurement phases

The control signals C64 and C65 are used during the measurement phases only, and are set to 0 during the servo-control phases. During the measurement phases, here equivalent to two periods of clock 71, C64 is at 1 while C65 is at 0 during the first clock period; C64 is at 0 while C65 is at 1 during the second clock period. During the first clock period, capacitors 3 and 4 are charged at values $V'_a = -V_r$ and $V'_b = +V_r$, respectively. When C65 is set to 1 (while C64 is at 0), the capacitors are simultaneously discharged in integrator 67, through node 66 and switch 65, with currents of opposite polarities. The capacitor 69 of integrator 67 is charged (or discharged) proportionally to the difference between the detection capacitors 3 and 4.

At the output of integrator 67, the error voltage $V_e$ varies with respect to its value acquired during the previous measurement phases, by a positive or negative quantity, according to the difference between the detection capacitors 3 and 4.

Figure 9:
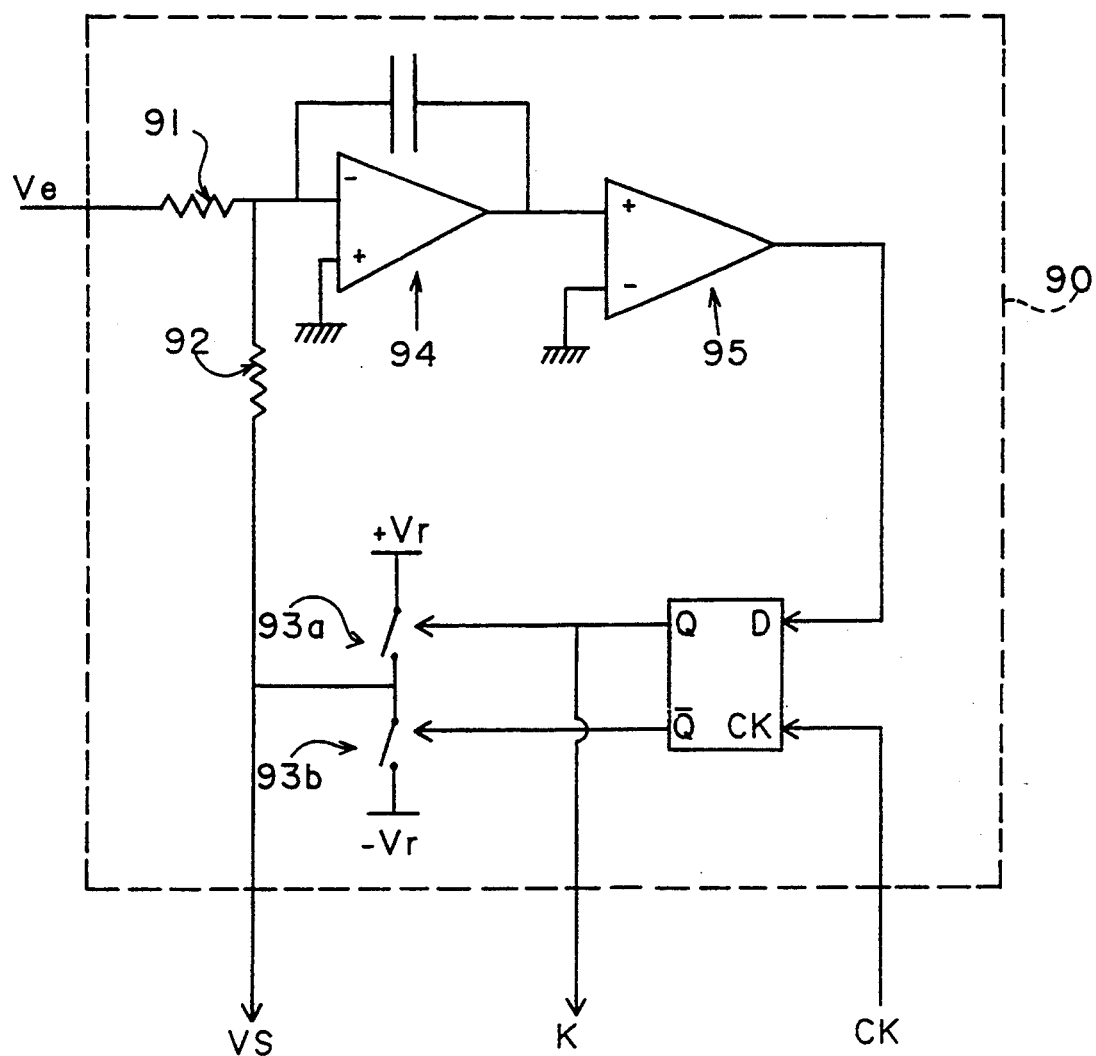

FIG. 9 schematically shows an embodiment of a sigma-delta type digital modulator 90. Voltage $V_e$ is applied to one terminal of a bridge of two resistors 91, 92 having the same value, the second terminal of which is coupled to two switches 93a, 93b connected to voltages $+V_r$ and $-V_r$, respectively.

The medium tap of the resistor bridge 91, 92 is applied at the input of an integrator 94 the output of which is connected to the positive input of a comparator 95 having its negative input connected to ground; the output of comparator 95 is applied to the input of a D flip-flop whose output Q is enabled by the signal CK of sequencer 70. The output Q provides the signal K and controls switch 93a, switch 93b being controlled by the reverse output $\overline{Q}$ of output Q.

The modulator 90 modulates the mean value of signal K drawn from the output Q of flip-flop D. This modulation occurs during a large number of cycles of modulator 90, the cycles being clocked by signal CK. When considering the values of signal K over a large number of cycles, it can be noted that the distribution of values K=1 and K=0 depends on voltage $V_e$. In fact, the output voltage of integrator 94 is formed by a series of increasing or decreasing voltage slopes fluctuating about voltage zero. Depending on the sign and value of $V_e$, the voltage slopes are unequal and the output of comparator 95 is to 1 or 0 during unequal time periods, which causes an unequal distribution of values K=1 and K=0, and therefore, an unequal distribution of the forces applied to the electrode pair 3a, 3b, and to the electrode pair 4a, 4b.

The output voltage $V_s$ of the micro-sensor 50, applied to the low-pass circuit 52 described with reference to FIG. 6, is drawn from the medium tap of the switch bridge 93a, 93b of modulator 90. In order to obtain an output voltage $V_s$ which is the exact image of the return force, means for inhibiting the control of switches 93a, 93b during the measurement phases could be provided so as to maintain switches 93a and 93b off during measurement phases. Also, signal K could be used as a digital output signal, or voltage $V_e$ (drawn from the output of filter 80) could be used as an analog output signal.

The accuracy of micro-sensor 50 depends on the frequency of clock 71 which sets the periods of the servo-control and measurement cycles.

In practice, a time reference T is selected shorter than the mechanical time constant of the pendular element 2. The frequency of clock 71 is selected so that the micro-sensor 50 performs a very large number of cycles during this time unit T.

Then, the values of voltages $+V_r$ and $-V_r$ can be acted upon in order to adjust the dynamic range of the micro-sensor 50.

It should be noted that the arrangement of the above-described switch assembly 600 advantageously allows to obtain control voltages ($-2 V_r$ and $+2 V_r$) whose amplitudes have twice the value of the source voltages $+V_r$ and $-V_r$. Thus, one obtains a dynamic range larger than with a simpler arrangement, including fewer switches, but providing control voltages with amplitudes not exceeding $+V_r$ and $-V_r$.

The electrostatic force applied to either one of electrode pairs 3a, 3b or 4a, 4b during a single servo-control phase is not significant and is only an example of the overall return force acting on the pendular element 2.

Those skilled in the art will note that it is necessary to calculate the balance of the opposite forces applied to the pendular element 2 by the electrode pairs 3a, 3b and 4a, 4b, in order to calculate the return electrostatic force acting, for example, during time T. It will be apparent that the mean return force is proportional to the mean value of signal K and that the conditions for controlling the pendular element 2 are complied with.

In the above-described embodiment, the frequency of clock 71 is 1 megahertz, the cut-off frequency $F_c$ of the pendular element 2 is approximately 10 hertz, and the mechanical time constant $\tau$ is approximately 0.1 second.

It is apparent that the micro-sensor 50 performs in the present case 10,000 servo-control and measurement cycles during a period corresponding to the time constant $\tau$.

It should be noted that it is not compulsory to use control voltages $V'_a$ and $V'_b$ of zero mean value during each servo-control phase, although it is more advantageous that the fluctuations of the control voltages $V'_a$ and $V'_b$ occur within the shortest possible periods with respect to the time constant $\tau$.

In an alternative embodiment, it is possible to more slowly alternate (between $+2 V_r$ and $-2 V_r$) each servo-control voltage $V'_a$ and $V'_b$, (for example, from one servo-control phase to another), so that each of the control voltages has a zero mean value only after the occurrence of several control cycles.

In the above, the basic elements of the micro-sensor according to the invention have been disclosed. As will be apparent to those skilled in the art, various variants and modifications can be made to the above-described exemplary micro-sensors.

Also, it will be apparent to those skilled in the art that the method according to the invention can be implemented in various manners, more particularly for the known conventional micro-sensors, by simply modifying the circuits providing the control voltages for the electrostatic servo-control force, so that the control voltages have a zero mean value.

We claim:

1. A method for providing an electrostatic return force between a mobile electrode and a fixed electrode for a micro-sensor measuring a physical quantity, said mobile electrode being integral with a pendular element sensitive to said physical quantity, comprising the step of applying to said electrodes a voltage having a zero mean value so as to impart to the electrodes an electrostatic return force opposing a force acting upon the electrodes by the physical quantity, wherein
    said voltage is formed by a plurality of electric signals of equal durations;
    each of said electric signals has a zero mean value;
    each of said electric signals is comprised of a periodic pulse train; and
    said periodic pulse trains comprise alternate d.c. signals of opposite polarity.

2. A method for providing an electrostatic return force between a mobile electrode and a fixed electrode for a micro-sensor measuring a physical quantity, said mobile electrode being integral with a pendular element sensitive to said physical quantity, comprising the step of applying to said electrodes a voltage having a zero mean value so as to impart to the electrodes an electrostatic return force opposing a force acting upon the electrodes by the physical quantity, wherein said voltage is a periodic voltage having a frequency higher than a cut-off frequency of the pendular element;

wherein said method is for servo-controlling through electrostatic forces a pendular element of a micro-sensor including:

at least one first and one second electrode pair each containing a mobile electrode integral with said pendular element, and a fixed electrode facing said mobile electrode, and a system for detecting the displacements of said pendular element providing a control signal for the servo-control operation to be achieved wherein a first control voltage and a second control voltage are respectively applied on said electrode pairs, wherein said first and second control voltages have the same frequency, and the difference of the squared respective amplitudes of said first and second control voltages is the product of a first term independent of said control signal by a second term proportional to said control signal.

3. The method of claim 2, wherein said first control voltage is obtained by subtraction, and said second control voltage is obtained by addition, of a first periodic voltage having a constant amplitude and of a second periodic voltage having an amplitude proportional to said control signal.

4. The method of claim 3, wherein said control signal is a control voltage, said voltage of constant amplitude is provided by an amplifier to which is applied a source voltage having a periodic voltage, and said amplitude voltage proportional to the control signal is provided by a multiplier receiving at its respective inputs said source voltage and said control voltage.

5. The method of claim 4, further comprising the steps of:

providing periodic detection voltages for detecting the capacity unbalance of said electrode pairs, adding said detection voltages with said control voltages, each of said electrode pairs having an electrode connected to the input of said detection circuit, and injecting at the input (39) of said detection circuit a current cancelling the current generated by said control voltages.

6. The method of claim 5, wherein said step of injecting a current cancelling the control current comprises receiving said source voltage at an amplifier connected to the input of said detection circuit through a capacitor.

7. A micro-sensor controlled through electrostatic forces, comprising:

a pendular element disposed so as to respond to a force representative of a physical quantity to be measured;

at least one first and one second electrode pair each including a mobile electrode associated with said pendular element and one fixed electrode facing each of said mobile electrodes;

an assembly of switches in circuit with at least two d.c. voltage sources of opposite polarity;

an integrating circuit whose input is received from said electrode pairs through said assembly of switches and whose output is applied to the input of a digital modulator of the sigma-delta type through a filter, said digital modulator providing a logic signal the mean value of which is modulated as a function of the output voltage of said integrating circuit;

a digital circuit for sequencing and controlling said switch assembly to which is applied said logical signal, said digital circuit and said switch assembly being arranged for:

(a) during electrostatic control phases of said pendular element:

alternatively connecting at least one electrode of an electrode pair selected as a function of the value of said logic signal, to each of said d.c. voltage sources, and alternating the d.c. voltage source, connected to said at least one electrode of a selected electrode pair, several times during a control phase, or several times during several control phases;

(b) during the phases of detection of the position of said pendular element, following each control phase:

charging the capacitances of said electrode pairs through said source voltages, then simultaneously discharging said capacitances in said integrating circuit (67), with respective currents of opposite polarity.

8. The micro-sensor of claim 7, wherein each electrode of each electrode pair is connected to each of said d.c. voltage sources through a switch of said switch assembly.

9. The micro-sensor of claim 7, wherein said digital modulator is clocked by a synchronization signal (CK) provided by said digital sequencing circuit (70) after each control phase.

10. The micro-sensor of claim 9, wherein said digital synchronization signal (CK) enables said logic signal (K).

11. The micro-sensor of claim 7, wherein said filter is of a proportional-integral-derivate type.

12. A micro-sensor for measuring a physical quantity, comprising:

at least one fixed electrode;

a pendular element that is sensitive to the physical quantity to be measured;

at least one mobile electrode movable with said pendular element and facing said at least one fixed electrode; and means for applying to said fixed and mobile electrodes a return voltage produced by an external voltage source, said return voltage being of zero mean value and producing at the electrodes an electrostatic return force opposing a force acting upon the electrodes by the physical quantity.

* * * * *